US007179772B2

(12) United States Patent
Keenan et al.

(10) Patent No.: US 7,179,772 B2
(45) Date of Patent: Feb. 20, 2007

(54) EXTENDED LATHERING PILLOW ARTICLE FOR PERSONAL CARE

(75) Inventors: Diane Marie Keenan, Derby, CT (US); Filomena Augusta Macedo, Naugatuck, CT (US); Gregory Aaron Grissett, Jacksonville, NC (US); David Robert Williams, Monroe, CT (US); Shauna Mary Lagatol, New Haven, CT (US)

(73) Assignee: Unilever Home & Personal Care USA, division of Conopco, Inc., Greenwich, CT (US)

( * ) Notice: Subject to any disclaimer, the term of this patent is extended or adjusted under 35 U.S.C. 154(b) by 215 days.

(21) Appl. No.: 10/937,555

(22) Filed: Sep. 9, 2004

(65) Prior Publication Data

US 2005/0288208 A1 Dec. 29, 2005

Related U.S. Application Data

(60) Provisional application No. 60/582,458, filed on Jun. 24, 2004.

(51) Int. Cl.
*C01D 17/04* (2006.01)
*C01D 3/10* (2006.01)

(52) U.S. Cl. ....................... 510/130; 510/439; 510/509

(58) Field of Classification Search ................ 510/130, 510/297, 439, 509
See application file for complete search history.

(56) References Cited

U.S. PATENT DOCUMENTS 1,808,834 A 6/1931 Busch, Sr.
3,242,093 A 3/1966 Compton
4,025,628 A 5/1977 Dewey et al.
4,234,442 A 11/1980 Cornelissens
4,272,393 A 6/1981 Gergely
4,291,685 A 9/1981 Taelman
4,311,606 A 1/1982 Kaeser
4,515,703 A 5/1985 Haq
4,592,855 A 6/1986 Gioffre et al.
4,600,620 A 7/1986 Lloyd et al.
4,601,938 A 7/1986 Deacon et al.
4,603,069 A 7/1986 Haq et al.
4,643,939 A 2/1987 Sugiyama et al.
4,666,707 A 5/1987 Eguchi et al.
4,745,021 A 5/1988 Ping, III et al.
4,791,097 A 12/1988 Walele et al.
4,808,322 A 2/1989 McLaughlin
4,852,201 A 8/1989 Wundrock et al.
4,886,387 A 12/1989 Goldberg et al.
4,941,990 A 7/1990 McLaughlin
4,946,617 A 8/1990 Sheridan et al.
5,006,339 A 4/1991 Bargery et al.
5,026,551 A 6/1991 Yorozu et al.
5,041,233 A 8/1991 Kutny et al.
5,091,102 A 2/1992 Sheridan
5,094,770 A 3/1992 Sheridan et al.
5,100,674 A 3/1992 Ser et al.
5,198,198 A 3/1993 Gladfelter et al.
5,306,439 A 4/1994 Lockhart
5,338,476 A 8/1994 Pancheri et al.
5,342,535 A 8/1994 Ramirez et al.
5,352,387 A 10/1994 Rahman et al.
5,431,841 A 7/1995 Lockhart
5,489,399 A * 2/1996 Koyakumaru et al. ...... 252/373
5,507,968 A * 4/1996 Palaikis ................... 15/229.11
5,560,873 A 10/1996 Chen et al.
5,578,562 A 11/1996 Lockhart
5,605,749 A 2/1997 Pike et al.
5,607,681 A 3/1997 Galley et al.
5,683,976 A 11/1997 Colurciello, Jr. et al.
5,714,451 A 2/1998 Brouwer et al.
5,718,729 A 2/1998 Harris
5,720,949 A 2/1998 Davis
5,804,546 A 9/1998 Hall
5,955,057 A 9/1999 Maunder et al.
6,063,390 A 5/2000 Farrell et al.
6,093,218 A 7/2000 Hall et al.
6,103,644 A 8/2000 Sheridan
6,121,215 A 9/2000 Rau
6,153,208 A 11/2000 McAtee et al.
6,190,678 B1 2/2001 Hasenoehrl et al.
6,217,854 B1 4/2001 Farrell et al.
6,280,757 B1 8/2001 McAtee et al.
6,338,855 B1 1/2002 Albacarys et al.
6,451,331 B1 9/2002 Slavtcheff et al.
6,475,977 B1 * 11/2002 Pfeiffer et al. .............. 510/439
6,491,928 B1 12/2002 Smith, III
6,610,312 B2 * 8/2003 Farrell et al. ............... 424/401
6,740,628 B2 * 5/2004 Bennie et al. .............. 510/221
6,750,165 B2 * 6/2004 Kakiuchi et al. ........... 442/319
2003/0139318 A1 * 7/2003 Pfeiffer et al. .............. 510/439

(Continued)

FOREIGN PATENT DOCUMENTS

DE 197 45 964 A1 10/1997

(Continued)

*Primary Examiner*—Lorna M. Douyon
(74) *Attorney, Agent, or Firm*—Milton L. Honig

(57) ABSTRACT

A personal care cleansing article is provided which includes a cleansing composition having a lathering surfactant and a water absorbing material capable of accepting at least ten times the weight of the material of water, the composition being held within a water-insoluble sachet.

11 Claims, No Drawings

U.S. PATENT DOCUMENTS

| | | | | |
|---|---|---|---|---|
| 2004/0185730 | A1 | 9/2004 | Lambino et al. | |
| 2004/0266650 | A1* | 12/2004 | Lambotte et al. | 510/438 |

FOREIGN PATENT DOCUMENTS

| | | | |
|---|---|---|---|
| EP | 62045519 | | 2/1987 |
| EP | 0 343 069 | | 5/1989 |
| EP | 0 343 070 | | 5/1989 |
| EP | 0 353 014 | | 7/1989 |
| EP | 0 423 015 | A1 | 4/1991 |
| EP | 0 806 201 | A2 | 5/1997 |
| FR | 2 196 632 | | 3/1974 |
| GB | 2 118 961 | A | 11/1983 |
| WO | 97/43366 | | 11/1997 |
| WO | 98/43303 | | 10/1998 |
| WO | WO 02/11600 | A1 * | 2/2002 |

* cited by examiner

EXTENDED LATHERING PILLOW ARTICLE FOR PERSONAL CARE

This application claims the benefit of U.S. Provisional Application No. 60/582,458, filed Jun. 24, 2004.

BACKGROUND OF THE INVENTION

1. Field of the Invention

The invention concerns a disposable personal care article in the form of a cleansing wipe with extended lathering properties for cleansing human body surfaces.

2. The Related Art

Personal care cleansing products traditionally have been limited to toilet bars and gel or liquid washing formulations. Consumers have integrated use of these products with their own wash cloths or body sponges.

Industry has identified a consumer desire for the convenience of a pre-combined cleanser with a wiping implement. The market has addressed the need through products that are substantially dry articles activated to foam by contact with water. These are woven or non-woven cloths impregnated with a cleansing composition primarily loaded with surfactant. Also present can be structurants, skin conditioning agents and other performance ingredients. This technology is described in the following patents.

U.S. Pat. No. 5,951,991 (Wagner et al.) focuses upon a dry cleansing cloth wherein a textile substrate is separately impregnated with a conditioning emulsion and then a lathering surfactant. Similar technology is found in U.S. Pat. No. 5,980,931 (Fowler et al.) and WO 99/55303 (Albacarys et al.).

Another approach to cleansing is reported in U.S. Pat. No. 6,063,390 (Farrell et al.). Therein are disclosed cosmetic wiping articles based upon a pouch formed by at least one water permeable wall and containing an effervescent cleanser composition in the form of an anhydrous dry powder. The powder contains a combination of alkaline material, acid material and a surfactant. Effervescence and foam is activated by contact with water.

A general problem with dry cleansing wipe articles is a tendency for foam not to last too long. Systems have been sought which would extend the foam phenomena.

SUMMARY OF THE INVENTION

A personal care cleansing article is provided including:

(i) a cleansing composition comprising a lathering surfactant present in a sufficient amount to generate a foam;

(ii) a water absorbent material with capacity to attract at least ten times as much water as weight of the material in a dried state; and (iii) a water insoluble sachet having at least one water permeable wall and housing therein the cleansing composition and absorbent material.

In another aspect of the invention there is provided a personal cleansing article in the form of a sachet filled with an expanded gel formed from a water absorbing material capable of combining with at least ten times its weight of water and exuding foamed lather.

DETAILED DESCRIPTION OF THE INVENTION

Now it has been found that sustained release of foaming surfactant from a sachet is achieved by formulating a highly water absorbent material into the cleansing composition held within the sachet. More particularly, the water absorbent material should be capable of capturing at least ten, preferably at least 20, more preferably at least 50 times its weight of water.

Cleansing compositions for use in the sachets will be formulated with a lathering surfactant. By a "lathering surfactant" is meant a surfactant, which when combined with water and mechanically agitated generates a foam or lather. Preferably, these lathering surfactants should be mild, which means that they must provide sufficient cleansing or detersive benefits but not overly dry the skin or hair.

The articles of the present invention typically include at least one lathering surfactant in an amount from about 0.5% to about 60%, preferably from about 0.75% to about 40%, and more preferably from about 1% to about 20%, even more preferably from about 2% to about 15% based on the weight of the cleansing composition.

A wide variety of lathering surfactants are useful herein and include those selected from the group consisting of anionic, nonionic, cationic, amphoteric and lathering surfactant mixtures thereof.

Among the anionic lathering surfactants useful herein are the following non-limiting examples which include the classes of:

(1) Alkyl benzene sulfonates in which the alkyl group contains from 9 to 15 carbon atoms, preferably 11 to 14 carbon atoms in straight chain or branched chain configuration. Especially preferred is a linear alkyl benzene sulfonate containing about 12 carbon atoms in the alkyl chain.

(2) Alkyl sulfates obtained by sulfating an alcohol having 8 to 22 carbon atoms, preferably 12 to 16 carbon atoms. The alkyl sulfates have the formula $ROSO_3\_M^+$ where R is the $C_{8-22}$ alkyl group and M is a mono- and/or divalent cation.

(3) Paraffin sulfonates having 8 to 22 carbon atoms, preferably 12 to 16 carbon atoms, in the alkyl moiety. These surfactants are commercially available as Hostapur SAS from Hoechst Celanese.

(4) Olefin sulfonates having 8 to 22 carbon atoms, preferably 12 to 16 carbon atoms. Most preferred is sodium $C_{14}$–$C_{16}$ olefin sulfonate, available as Bioterge AS 40®

(5) Alkyl ether sulfates derived from an alcohol having 8 to 22 carbon atoms, preferably 12 to 16 carbon atoms, ethoxylated with less than 30, preferably less than 12, moles of ethylene oxide. Most preferred is sodium lauryl ether sulfate formed from 2 moles average ethoxylation, commercially available as Standopol ES-2®.

(6) Alkyl glyceryl ether sulfonates having 8 to 22 carbon atoms, preferably 12 to 16 carbon atoms, in the alkyl moiety.

(7) Fatty acid ester sulfonates of the formula: $R^1CH(SO_3\_M+)CO_2R^2$ where $R^1$ is straight or branched alkyl from about $C_8$— to $C_{18}$, preferably $C_{12}$ to $C_{16}$, and $R^2$ is straight or branched alkyl from about $C_1$ to $C_6$, preferably primarily $C_1$, and M+ represents a mono- or divalent cation.

(8) Secondary alcohol sulfates having 6 to 18, preferably 8 to 16 carbon atoms.

(9) Fatty acyl isethionates having from 10 to 22 carbon atoms, with sodium cocoyl isethionate being preferred.

(10) Dialkyl sulfosuccinates wherein the alkyl groups range from 3 to 20 carbon atoms each.

(11) Alkanoyl sarcosinates corresponding to the formula $RCON(CH_3)CH_2CH_2CO_2M$ wherein R is alkyl or alkenyl of about 10 to about 20 carbon atoms and M is a water-soluble cation such as ammonium, sodium, potassium and trialkanolammonium. Most preferred is sodium lauroyl sarcosinate.

(12) Alkyl lactylates wherein the alkyl groups range from 8 to 12 carbon atoms, with sodium lauroyl lactylate sold as Pationic 138C® available from the Patterson Chemical Company as the most preferred.

(13) Taurates having from 8 to 16 carbon atoms, with cocoyl methyl taurate being preferred.

Nonionic lathering surfactants suitable for the present invention include $C_{10}$–$C_{20}$ fatty alcohol or acid hydrophobes condensed with from 2 to 100 moles of ethylene oxide or propylene oxide per mole of hydrophobe; $C_2$–$C_{10}$ alkyl phenols condensed with from 2 to 20 moles of alkylene oxides; mono- and di-fatty acid esters of ethylene glycol such as ethylene glycol distearate; fatty acid monoglycerides; sorbitan mono- and di-$C_8$–$C_{20}$ fatty acids; and polyoxyethylene sorbitan available as Polysorbate 80 and Tween 80® as well as combinations of any of the above surfactants.

Other useful nonionic surfactants include alkyl polyglucosides, saccharide fatty amides (e.g. methyl gluconamides) as well as long chain tertiary amine oxides. Examples of the latter category are: dimethylododecylamine oxide, oleyldi(2-hydroxyethyl)amine oxide, dimethyloctylamine oxide, dimethyldecylamine oxide, dimethyltetradecylamine oxide, di(2-hydroxyethyl)tetradecylamine oxide, 3-didodecyloxy-2-hydroxypropyldi(3-hydroxypropyl)amine oxide, and dimethylhexadecylamine oxide.

Amphoteric lathering surfactants useful for the present invention include aliphatic secondary and tertiary amines, preferably wherein the nitrogen is in a cationic state, in which the aliphatic radicals can be straight or branched chain and wherein one of the radicals contains an ionizable water solubilizing group such as carboxy, sulphonate, sulphate, phosphate or phosphonate. Illustrative substances are cocamidopropyl betaine, cocamphoacetate, cocamphodiacetate, cocamphopropionate, cocamphodipropionate, cocamidopropyl hydroxysultaine, cetyl dimethyl betaine, cocamidopropyl PG-dimonium chloride phosphate, coco dimethyl carboxymethyl betaine, cetyl dimethyl betaine and combinations thereof.

For lather to be sufficient, the amount of foam generated should attain at least a 5 ml average lather volume as determined by the Lather Volume Test described in U.S. Pat. No. 6,280,757 B1 herein incorporated by reference. Advantageously the average lather volume should be at least about 10 ml, more preferably at least about 15 ml, even more preferably at least about 30 ml.

Another important component of the cleansing compositions is that of a highly water absorbent material. For definition purposes, water absorbent attraction may mean water capture within a gel network, capture within voids of a highly porous substance, combination as water of hydration and association by Van Der Waals forces. An example of physical capture within void pockets is use of powdered fibers known as Tencel available from the Dash Company. These fibers are non-woven cotton of very fine denier.

Highly absorbent gelling polymers are particularly useful to entrap lathering surfactant within a gel network when wetted with water. Preferred absorbent gelling polymers for use in the present invention contain carboxy groups. These polymers include hydrolyzed starch-acrylonitrile graft copolymers, partially neutralized hydrolyzed starch-acrylonitrile graft copolymers, starch-acrylic acid graft copolymers, partially neutralized starch-acrylic acid graft copolymers, saponified vinyl acetate-acrylic ester copolymers, hydrolyzed acrylonitrile or acrylamide copolymers, slightly network crosslinked polymers of any of the foregoing copolymers, partially neutralized polyacrylic acid, and slightly network crosslinked polymers of any of the foregoing copolymers, partially neutralized polyacrylic acid, and slightly network crosslinked polymers of partially neutralized polyacrylic acid. These polymers can be used either solely or in the form of a mixture of two or more different polymers. Examples of these polymer materials are disclosed in U.S. Pat. Nos. 3,661,875, 4,076,663, 4,093,776, 4,666,983, and 4,734,478. All disclosures of patents described in the present application including the aforementioned are incorporated herein by reference.

Illustrative absorbent organic polymeric materials which are commercially available are the polymers known as Favor-Pac®-100 (crosslinked polyacrylamide), Favor-Pac® 210 and 300 (crosslinked sodium polyacrylate) all available from the Stockhausen Division of Huls GmbH; Sanwet® IM-300 and –1000 (crosslinked starch-grafted-polyacrylates) available from Sanyo Chemical Industries; and Water Lock® G400, J-500, C-200, B-204 and A-100 (starch-graft-poly(sodium acrylate-co-acrylamide) available from Paroxite Limited (UK).

While the absorbent gelling polymers are preferably of one type (i.e., homogeneous), mixtures of polymers can also be used in the implements of the present invention. For example, mixtures of starch-acrylic acid graft copolymers and slightly network crosslinked polymers of partially neutralized polyacrylic acid can be used in the present invention.

Other useful absorbent materials include hydrophilic polymeric foams such as those described in U.S. Pat. No. 5,387,207 (Dyer et al.), issued Feb. 7, 1995. Therein described are polymeric, hydrophilic absorbent foams that are obtained by polymerizing a high internal phase water-in-oil emulsion (commonly referred to as HIPEs). These foams are readily tailored to provide varying physical properties (pore size, capillary suction, density that affect fluid handling ability. They are particularly useful, either alone or in combination with other such foams or with fibrous structures, in providing the overall capacity required by the present invention.

Amounts of the water absorbent material may range from about 0.1 to about 70%, preferably from about 1 to about 40%, more preferably from about 5 to about 20% and optimally from about 8 to about 15% by weight of the cleansing composition.

When the personal care article is intended to be an effervescent type, an alkaline material must be present. The alkaline material is a substance which can generate a gas such as carbon dioxide, nitrogen or oxygen, i.e. effervesce, when contacted with water and the acidic material. Suitable alkaline materials are anhydrous salts of carbonates and bicarbonates, alkaline peroxides (e.g. sodium perborate and sodium percarbonate) and azides (e.g. sodium azide). Preferably the alkaline material is sodium or potassium bicarbonate. Amounts of the alkaline material may range from about 1 to about 80%, preferably from about 5 to about 49%, more preferably from about 15 to about 40%, optimally from about 20 to about 35% by weight of the cleansing composition.

For an effervescent type personal care cleansing composition, there will also be an acidic material present. Suitable for this purpose are any acids, and preferably those present in dry solid form. Especially appropriate are $C_2$–$C_{20}$ organic mono- and poly-carboxylic acids and especially alpha- and beta-hydroxycarboxylic acids; $C_2$–$C_{20}$ organophosphorus acids such as phytic acid; $C_2$–$C_{20}$ organosulfur acids such as toluene sulfonic acid; and peroxides such as hydrogen peroxide. Typical hydroxycarboxylic acids include adipic, glutaric, succinic, tartaric, malic, maleic, lactic, salicylic and citric acids as well as acid forming lactones such as gluconolactone and glucarolactone. Most preferred is citric acid. Also suitable as acid material may be encapsulated acids. Typical encapsulating material may include water soluble synthetic or natural polymers such as polyacrylates (e.g. encapsulating polyacrylic acid), cellulosic gums, polyurethane and polyoxyalkylene polymers. By the term "acid" is meant any substance which when dissolved in deionized water at 1% concentration will have a pH of less than 7, preferably less than 6.5, optimally less than 5. These acids preferably at 25° C. are in solid form, i.e. having melting points no less than 25° C. Concentrations of the acid should range from about 0.5 to about 80%, preferably from about 10 to about 65%, optimally from about 20 to about 45% by weight of the cleansing composition.

Personal care articles of the present invention in a preferred embodiment are substantially dry. In another embodiment of the present invention, any water present in an otherwise substantially dry personal care article will be tied up with the water absorbent solid of this invention. By the term "substantially anhydrous" or "substantially dry" is meant the presence of no more than about 25%, preferably no more than about 10%, more preferably no more than about 5%, and optimally no more than 1% of water by weight of the cleansing composition or article, respectively.

Advantageously the combined amount of acidic and alkaline materials when present will be at least about 1.5%, preferably from about 40 to about 95%, optimally from about 60 to about 80% by weight of the cleansing composition.

A variety of skin benefit agents may be included to improve afterfeel properties. Advantageously these substances will be available as substantially dry powders. Alternatively these substances may be liquids deposited upon or into a powdered substrate (e.g. calcium silicate or zeolite) to achieve a resultant dry flowing powder. Within the skin benefit agent scope are several categories of materials. These include emollients, antiaging actives, antibacterials and fungicides, skin lighteners, sunscreens and combinations thereof. Amounts of the skin benefit agents may range from about 0.001 to about 40%, preferably from about 0.1 to about 20%, more preferably from about 0.5 to about 10%, optimally between about 1 and about 5% by weight of the total composition.

Emollients may be in the form of natural or synthetic esters, silicone oils, hydrocarbons, starches, fatty acids and mixtures thereof. Typically the emollient may range in concentration from about 0.1 to about 35% by weight of the cleansing composition.

Silicone oils may be divided into the volatile and nonvolatile variety. The term "volatile" as used herein refers to those materials which have a measurable vapor pressure at ambient temperature. Volatile silicone oils are preferably chosen from cyclic or linear polydimethylsiloxanes containing from 3 to 9, preferably from 4 to 5, silicon atoms.

Nonvolatile silicone oils useful as an emollient material include polyalkyl siloxanes, polyalkylaryl siloxanes and polyether siloxane copolymers. The essentially non-volatile polyalkyl siloxanes useful herein include, for example, polydimethyl siloxanes with viscosities of from about 5 to about 100,000 centistokes at 25° C. Among the preferred non-volatile emollients useful in the present compositions are the polydimethyl siloxanes having viscosities from about 10 to about 400 centistokes at 25° C.

Among the ester emollients are:

(a) Alkenyl or alkyl esters of fatty acids having 10 to 22 carbon atoms. Examples thereof include isoarachidyl neopentanoate, isononyl isonanonoate, oleyl myristate, oleyl stearate, and oleyl oleate.

(b) Ether-esters such as fatty acid esters of ethoxylated fatty alcohols.

(c) Polyhydric alcohol esters. Ethylene glycol mono and di-fatty acid ester, diethylene glycol mono- and di-fatty acid esters, polyethylene glycol (200–8000) mono- and di-fatty acid esters, polypropylene glycol 2000 monooleate, polypropylene glycol 2000 monostearate, ethoxylated propylene glycol monostearate, glyceryl mono- and di-fatty acid esters, polyglycerol poly-fatty esters, ethoxylated glyceryl monostearate, 1,3-butylene glycol monostearate, 1,3-butylene glycol distearate, polyoxyethylene polyol fatty acid ester, sorbitan fatty acid esters, and polyoxyethylene sorbitan fatty acid esters are satisfactory polyhydric alcohol esters.

(d) Wax esters such as beeswax, spermaceti, myristyl myristate, stearyl stearate and arachidyl behenate.

(e) Sterols esters, of which cholesterol fatty acid esters are examples thereof.

(f) Triglycerides such as sunflower seed oil, maleated sunflower seed oil, polycottonseedate, borage seed oil and safflower oil.

Hydrocarbons suitable as emollients include petrolatum, mineral oil, isoparaffins and hydrocarbon waxes such as polyethylene.

Starches are also suitable emollients. Typical of this class is tapioca and arabinogalactan.

Fatty acids may also be suitable as emollients. The fatty acids normally have from 10 to 30 carbon atoms. Illustrative of this category are pelargonic, lauric, myristic, palmitic, stearic, isostearic, hydroxystearic, oleic, linoleic, ricinoleic, arachidic, behenic and erucic acids.

Antiaging actives are also useful as skin benefit agents. Included within this category are vitamins, retinoids and combinations thereof. Amounts of these materials may range from about 0.001 to about 20% by weight of the total composition. Suitable vitamins include ascorbic acid, Vitamin $B_3$, Vitamin $B_6$, Vitamin $B_{12}$, tocopherol as well as salts and $C_1$–$C_{20}$ esters thereof. Suitable retinoids include retinoic acid as well as its $C_1$–$C_{22}$ esters and salts, retinol and $C_1$–$C_{22}$ fatty esters of retinol including retinyl linoleate.

Another class of antiageing actives are the alpha- and beta-hydroxycarboxylic acids and salts thereof. Representative of this group are glycolic acid, lactic acid, malic acid, hydroxyoctanoic acid, salicylic acid and mixtures of these as well as their salts. Suitable salts are the alkalimetal, ammonium and $C_1$–$C_{10}$ alkanol ammonium salts. Malonic acid and salts thereof such as dimethylethanolammonium malonate may also be formulated into the cleansing compositions as antiageing actives.

Antibacterials and fungicidals may also be included as skin benefit agents. Representative of these categories are triclosan, triclocarbon, hexetidene, chlorhexedene, gluconates, zinc salts (e.g. zinc citrate and zinc phenolsulfonate) and combinations thereof.

Skin lighteners may also be included under the skin benefit agents. Typical of this category are niacinamide, kojic acid, arbutin, vanillin, ferulic acid and esters thereof, resorcinol, hydroquinone, placental extract and combinations thereof.

Sunscreens may also be included as skin benefit agents. Particularly preferred are such materials as ethylhexyl p-methoxycinnamate, available as Parsol® MCX, avobenzene available as Parsol® 1789 and benzophenone-3, also known as Oxybenzone. Inorganic sunscreen actives may be employed such as microfine titanium dioxide, zinc oxide, polyethylene and various other polymers. Amounts of the sunscreen agents may generally range from 0.1 to 30%, preferably from 2 to 20%, optimally from 4 to 10% by weight.

Adjunct functional agents may also be incorporated into compositions of the present invention. These include electrolytes, thickeners and mixtures thereof. Amounts of these substances may range from about 0.1 to about 20%, preferably from about 0.3 to about 10%, optimally between about 0.5 and about 5% by weight of the cleansing composition.

Electrolytes may be selected from alkali, alkaline earth or ammonium salts of phosphates, silicates, halides, sulphates and mixtures thereof. Typical phosphates are potassium polymetaphosphate, sodium tripolyphosphate, sodium tetrapyrophosphate, sodium or potassium pyrophosphate and sodium hexametaphosphate. Most preferred is potassium polymetaphosphate available as Lipothix 100B® which is a 70:30 mixture of potassium polymetaphosphate and sodium bicarbonate, available from Lipo Chemicals, Inc., Paterson, N.J. Preferred sulphates are the magnesium sulphates.

Thickeners which may improve afterfeel properties on skin include inorganic or organic substances. A particularly preferred inorganic thickener is sodium magnesium silicate commercially available as Optigel SH®. Organic thickeners include alginic acid as well as sodium and calcium alginates, sodium carboxymethyl cellulose, hydroxypropyl methylcellulose, hydroxypropyl cellulose, hydroxyethyl cellulose and combinations thereof. Most preferred is alginic acid commercially available as Kelacid® from Sud-Chemie Rheologicals, Louisville, Ky. Alginic acid is highly effective at removing the slimy feel associated with deposits of alkaline material which are not fully rinsed away from the skin. Amounts of the thickener may range from about 0.1 to about 20% by weight of the cleansing composition.

Polysaccharides useful in this invention are dry solid anhydrous substances such as sorbitol, sugars, (such as trehalose), starches, modified starches (e.g. aluminum octenyl succinate) and mixtures thereof. Most preferred is sorbitol.

Advantageously an emotive agent such as a fragrance and/or botanical extract are included with the effervescent cleansing composition. Fragrances and botanicals are often liquids. For this reason it may be necessary to uniformly distribute and allow absorption of liquid components into the solid powder. One method of best achieving this is to spray these liquids onto the solids. Amounts of the fragrance and/or botanicals combined may be at levels from about 0.1 to about 3%, preferably from 0.5 to 2%, optimally from 0.8 to 1.5% by weight of the cleansing composition.

Colorants may also be included in the cleansing compositions of the present invention. These substances may range from about 0.05 to about 5%, preferably between 0.1 and 3% by weight.

A necessary element of the present invention is that of a water insoluble substrate. By "water insoluble" is meant the substrate does not dissolve or readily break apart upon immersion in water. A wide variety of materials can be used as the substrate. The following non-limiting characteristics may be desirable: (i) sufficient wet strength for use, (ii) sufficient abrasivity, (iii) sufficient loft and porosity, (iv) sufficient thickness, and (v) appropriate size.

Non-limiting examples of suitable insoluble substrates which meet the above criteria include non-woven substrates, woven substrates, hydro-entangled substrates, air entangled substrates and the like. Preferred embodiments employ non-woven substrates since they are economical and readily available in a variety of materials. By non-woven is meant that the layer is comprised of fibers which are not woven into a fabric but rather are formed into a sheet, particularly a tissue. The fibers can either be random (i.e., randomly aligned) or they can be carded (i.e. combed to be oriented in primarily one direction). Furthermore, the non-woven substrate can be composed of a combination of layers of random and carded fibers.

Non-woven substrates may be comprised of a variety of materials both natural and synthetic. By natural is meant that the materials are derived from plants, animals, insects or byproducts. By synthetic is meant that the materials are obtained primarily from various man-made materials or from material that is usually a fibrous web comprising any of the common synthetic or natural textile-length fibers, or mixtures thereof.

Non-limiting examples of natural materials useful in the present invention are silk fibers, keratin fibers and cellulosic fibers. Non-limiting examples of keratin fibers include those selected from the group consisting of wool fibers, camel hair fibers, and the like. Non-limiting examples of cellulosic fibers include those selected from the group consisting of wood pulp fibers, cotton fibers, hemp fibers, jute fibers, flax fibers, and mixtures thereof.

Non-limiting examples of synthetic materials useful in the present invention include those selected from the group consisting of acetate fibers, acrylic fibers, cellulose ester fibers, modacrylic fibers, polyamide fibers, polyester fibers, polyolefin fibers, polyvinyl alcohol fibers, rayon fibers and mixtures thereof. Examples of some of these synthetic materials include acrylics such as Acrilan®, Creslan®, and the acrylonitrile-based fiber, Orlon®; cellulose ester fibers such as cellulose acetate, Arnel®, and Acele®; polyamides such as Nylons (e.g., Nylon 6, Nylon 66, and Nylon 610); polyesters such as Fortrel®, Kodel®, and Dacron®; polyolefins such as polypropylene, polyethylene; polyvinyl acetate fibers and mixtures thereof.

Non-woven substrates made from natural materials consist of webs or sheets most commonly formed on a fine wire screen from a liquid suspension of the fibers.

Substrates made from natural materials useful in the present invention can be obtained from a wide variety of commercial sources. Non-limiting examples of suitable commercially available paper layers useful herein include Airtex®, an embossed airlaid cellulosic layer available from James River Corporation, Green Bay, Wis.; and Walkisoft®, an embossed airlaid cellulosic available from Walkisoft U.S.A., Mount Holly, N.C.

Non-woven substrates made from synthetic material useful in the present invention can also be obtained form a wide variety of commercial sources. Non-limiting examples of suitable non-woven layer materials useful herein include HFE-40-047, an apertured hydroentangled material containing about 50% rayon and 50% polyester available from Vertec, Inc., Walpole, Mass.; HEF 140-102, an apertured hydro-entangled material containing about 50% rayon and 50% polyester available from Veratec, Inc., Walpole, Mass.; Novenet® 149-191, a thermo-bonded grid patterned material containing about 69% rayon, about 25% polypropylene, and about 6% cotton available from Veratec, Inc., Walpole, Mass.; HEF Nubtex® 149-801, a nubbed, apertured hydro-entangled material, containing about 100% polyester available from Veratec, Inc. Walpole, Mass.; Keybak® 951V, a dry formed apertured material, containing about 75% rayon and about 25% acrylic fibers available from Chicopee Corporation, New Brunswick, N.J.; Keybak® 1368, an apertured material, containing about 75% rayon and about 5% polyester available from Chicopee Corporation, New Brunswick, N.J.; Duralace® 1236, an apertured, hydro-entangled material, containing about 100% rayon available from Chicopee Corporation, New Brunswick, N.J.; Duralace® 5904, an apertured, hydro-entangled material, containing about 100% polyester available from Chicopee Corporation, New Brunswick, N.J.; Sontara® 8868, a hydro-entangled material, containing about 50% cellulose and about 50% polyester available from Dupont Chemical Corp.

The water insoluble substrates of the present invention can comprise two or more layers, each having a different texture and abrasiveness. The differing textures can result from the use of different combinations of materials or from the use of a substrate having a more abrasive side for exfoliation and a softer, absorbent side for gentle cleansing. In addition, separate layers of the substrate can be manufactured to have different colors, thereby helping the user to further distinguish the surfaces.

The amount of cleansing composition and absorbent solid relative to the substrate may range in weight from about 20:1 to 1:20, preferably from 10:1 to about 1:10 and optimally from about 2:1 to about 1:2 by weight.

A preferred embodiment of the sachet includes one wall which is formed of a spunlace substrate and a second wall formed of a meltblown composite substrate, the latter being bonded to a high loft sheet. The powdered cleansing composition and absorbent solid is dosed into a pouch of the sachet and the walls ultrasonically sealed to ensure no loss of the powdered composition. Copious foam is generated when the pouch is wetted with water, much in the same manner as a toilet bar is lathered.

Cosmetic wiping articles of the present invention when contacted with water billow to many times (more than ten but often more than 40 times) their dry size when activated by water. The cleansing system exudes copious amounts of lather and effervescent gases from bicarbonate decomposition when the latter is present. A plumped "pillow" arises from the effervescent action. The water absorbent component as water is absorbed increases in volume and also plumps the sachet to achieve a pillow shape pressing against inner walls of the sachet. Indeed, in the presence of sufficient water absorbent material and even in the absence of effervescent chemicals, the sachet can billow outwardly on the sole expansion force of the water absorbent material.

Except in the operating and comparative examples, or where otherwise explicitly indicated, all numbers in this description indicating amounts of material are to be understood as modified by the word "about".

The term "comprising" is meant not to be limiting to any subsequently stated elements but rather to encompass non-specified elements of major or minor functional importance. In other words the listed steps, elements or options need not be exhaustive.

The following examples will more fully illustrate embodiments of this invention. All parts, percentages and proportions referred to herein and in the appended claims are by weight unless otherwise indicated.

EXAMPLE 1

A personal care cleansing article of the effervescent type is prepared having the composition reported in Table 1. Phase A is dry blended in a high speed shearing mixer. Fragrance is then sprayed onto the resultant powder as a Phase B. Only those particles with average particle size from 75 to 900 micron are employed for the cleansing composition. These are separated by sifting through a set of wire screens. Three grams of the selected sifted powder are then placed into a 5 by 7.5 cm square sachet formed of non-woven rayon/polyester. All sides are closed by thermal heat sealing.

TABLE I

| Ingredient | Relative Weight |
|---|---|
| PHASE A | |
| Sodium Bicarbonate | 23.6 |
| Citric Acid (Anhydrous) | 29.0 |
| Sodium Crosslinked Polyacrylate | 20.0 |
| Sodium Cocoyl Isethionate (Powder) | 3.0 |
| Sodium Methyl Cocoyl Taurate | 6.0 |
| Sodium Lauryl Sulfate | 2.5 |
| Sodium Sesquicarboflate | 5.0 |
| Lipothix 100B ® (Potassium Polymetaphosphate/Bicarbonate 70:30) | 0.5 |
| Optigel SH ® (Sodium Magnesium Silicate) | 2.0 |
| Tapioca | 1.75 |
| Methyl Gluceth 20-Benzoate | 2.0 |
| Guar Hydroxypropyl Trimonium Chloride | 4.0 |
| PHASE B | |
| Fragrance | 0.65 |

EXAMPLE 2

Another personal care article according to the present invention has a cleansing composition listed in Table II.

TABLE II

| Ingredient | Relative Weight |
|---|---|
| Phase A | |
| PEG 8000 | 5.00 |
| Sodium $C_{14-16}$ Olefin Sulfonate | 3.75 |
| Sodium Cocoyt Isethonate | 3.75 |
| Sodium Lauryl Sulfoacetate | 3.75 |
| Sodium Stearate | 3.00 |
| Disodium Dimethicone Copolyol Sulfosuccinate | 1.00 |
| Polyquaternium-7 | 0.50 |
| DL-Panthenol | 0.02 |
| Sodium Stearoyl Lactylate | 5.00 |
| Jaguar C-13 S ® | 3.00 |
| Phase B | |
| Crosslinked Sodium Polyacrylate | 62.9 |
| Calcium Silicate | 7.00 |
| Mineral Oil | 4.00 |
| Vitamin A Palmitate | 0.01 |
| Vitamin E Acetate | 0.02 |
| Green Tea Extract | 0.20 |
| Sunflower Seed Oil | 0.01 |
| Fragrance | 0.50 |

A sachet is prepared from a layer of spunlace substrate and a second wall of non-woven meltblown/spunbond sheet to which a high loft web is attached. The high loft has a density of 0.05 $g/c^2$ and a thickness of 2 cm. The sachet is created by welding through ultrasonic heat together edges of the first and second substrates. Prior to completing welding with partial formation of a sachet, the cleansing composition powder of Table II is dosed at 2.9 grams into the 3 gram weight sachet.

In use, the sachet is held under running water. The oval shaped sachet as water gels the crosslinked sodium polyacrylate component of the cleansing composition results in an expansion of the cleansing composition. The sachet billows outward in response to the expanding gel network.

EXAMPLE 3

A series of experiments were conducted to evaluate the effect of highly absorbent materials ("super absorbence") on improving properties of cleansing sachets billowed with effervescent gas. In these systems the effervescent gases are generated by water activated citric acid neutralization of sodium bicarbonate. Table III describes the formulas tested. Each of these formulas was placed in a sachet similar to that described under Example 2.

TABLE III

| | Relative Weight | | |
|---|---|---|---|
| Ingredient | Sample A | Sample B | Sample C |
| Phase A | | | |
| Calcium Silicate | 5.75 | 5.75 | 5.75 |
| Phase B | | | |
| Fragrance | 0.50 | 0.50 | 0.50 |
| Sweet Almond Oil | 2.00 | 2.00 | 2.00 |
| Heavy Mineral Oil | 2.00 | 2.00 | 2.00 |
| Lauryl Alcohol | 0.50 | 0.50 | 0.50 |
| Vitamin E Acetate | 0.02 | 0.02 | 0.02 |
| Herbal Extracts | 0.20 | 0.20 | 0.20 |
| Vitamin A Palmitate | 0.01 | 0.01 | 0.01 |
| Sunflower Seed Oil | 0.01 | 0.01 | 0.01 |
| Phase C | | | |
| Pluracare ® | 3.00 | 3.00 | 3.00 |
| Sodium $C_{14-16}$ Olefin Sulfonate | 4.00 | 4.00 | 4.00 |
| PEG 8000 | 3.00 | 3.00 | 3.00 |
| Disodium Lauryl Sulfosuccinate | 4.00 | 4.00 | 4.00 |
| Lauramidopropyl Betaine | 3.00 | 3.00 | 3.00 |
| Jaguar C13S (Guar Hydroxypropyltrimonium Chloride) | 3.00 | 3.00 | 3.00 |
| Sodium Stearoyl Lactylate | 2.00 | 2.00 | 2.00 |
| Sodium Stearate | 2.00 | 2.00 | 2.00 |
| DL-Panthenol | 0.02 | 0.02 | 0.02 |
| Phase D | | | |
| Citric Acid | 26.15 | 13.08 | 0.0000 |
| Sodium Bicarbonate | 26.13 | 13.07 | 0.00 |
| Crosslinked Sodium Polyacrylate | 0 | 24.14 | 52.28 |
| Phase E | | | |
| Maltodextrin | 12.26 | 12.26 | 12.26 |

The samples reported in Table III were evaluated for sustained billowing (e.g. generation of gas or gel expansion to maintain an inflated sachet). In this test the sachets, alternatively known as pillows, were held under running water (flow at 2000 ml/min at 46° C.). Recordation was of the time under the water flow necessary to achieve an acceptable degree (i.e. height of 3.16 cm) pillow inflation. Each sachet was rotated to an opposite side under the water flow every 3 seconds. Results are recorded in Table IV.

TABLE IV

| Sample | Average Time To "Puff" (Seconds) | Duration of "Puff" (Seconds) |
|---|---|---|
| A | 2.6 | 104.6 |
| B | 4.8 | Infinite |
| C | 10.8 | Infinite |

Sample A formulated without superabsorbent material inflated rapidly. A much more controlled inflation was seen with Sample B wherein half of the citric/bicarbonate system of Sample A was replaced by super-absorbent material. Total replacement of citric/bicarbonate with super-absorbent material resulted in the most controlled prolonged inflation. This inflation was due to expansion of wetted superabsorbent into a gel network. A further benefit of using superabsorbent material (activated to the gel state with water) is that once inflated the sachet does not deflate as with purely effervescent gas inflation. This effect is shown in Table IV as duration of the "puff". Sample A remained inflated for 104.6 seconds (average of five measurements). Samples B and C did not deflate due to the formation of gel network. Another measure of inflation was through the Crush Weight Test. In this evaluation, the fully inflated (puffed) sachets were placed on a flat surface with a flat paper plate placed on top of each sample. Weights were then slowly added to each plate (centered over the sachet) until the sachet flattened. Weights were added in 25 g segments. Results are recorded in Table V.

TABLE V

| Sample | Crush Weight (g) |
|---|---|
| A | 175 |
| B | 525 |
| C | Greater than 1000 |

What is claimed is:

1. A substantially dry personal care article comprising:

(i) a cleansing composition comprising a lathering surfactant present in a sufficient amount to generate a foam, wherein the lathering surfactant is an anionic surfactant from about 1% to about 80% of a bicarbonate salt and from about 0.5 to about 80% of an acid material;

(ii) a water absorbent material with capacity to attract at least ten times as much water as weight of the material in a dried state, wherein the water absorbent material is selected from the group consisting of crosslinked polyacrylate, crosslinked polyacrylamide and starch-graft-poly(acrylate-co-acrylamide); and (iii) a water insoluble sachet having at least one water permeable wall and housing therein the cleansing composition and absorbent material.

2. The article according to claim 1 wherein the lathering surfactant is present in an amount from about 0.5 to about 60% by weight of the cleansing composition.

3. The article according to claim 1 wherein the weight amount of cleansing composition and absorbent material relative to the sachet ranges from about 20:1 to about 1:20.

4. The article according to claim 1 wherein the cleansing composition further comprises from about 0.1 to about 35% of an emollient by weight of the cleansing composition.

5. The article according to claim 4 wherein the emollient is selected from the group consisting of natural or synthetic esters, silicone oils, hydrocarbons, fatty acids and mixtures thereof.

6. The article according to claim 1 wherein the water absorbent material has a capacity to attract at least twenty times as much water as weight of the material in a dried state.

7. The article according to claim 1 which generates at least 5 ml average lather volume in a Lather Volume Test.

8. The article according to claim 1 wherein no more than about 10% water is present by weight of the article.

9. The article according to claim 1 wherein no more than about 5% water is present by weight of the article.

10. The article according to claim 1 wherein the bicarbonate salt is present in an amount from about 5% to about 49% by weight of the cleansing composition.

11. The article according to claim 1 wherein the acid material is present in an amount from about 10 to about 45% by weight of the cleansing composition.

* * * * *